United States Patent [19]

Kaufman, Jr. et al.

[11] Patent Number: 4,556,572
[45] Date of Patent: Dec. 3, 1985

[54] METHOD OF FIXING AN EDIBLE COATING TO A FOOD PRODUCT

[75] Inventors: Harold B. Kaufman, Jr.; John P. McCarthy, both of New York, N.Y.; Bernard J. Entner, Nutley, N.J.; Kurt Wallenfels, New York, N.Y.

[73] Assignee: DCA Food Industries Inc., New York, N.Y.

[21] Appl. No.: 103,866

[22] Filed: Dec. 14, 1979

Related U.S. Application Data

[63] Continuation of Ser. No. 839,616, Oct. 5, 1977, abandoned.

[51] Int. Cl.⁴ .................................................. A23L 3/16
[52] U.S. Cl. ...................................... 426/289; 99/483; 426/293; 426/305; 426/511; 426/520
[58] Field of Search ............... 426/510, 511, 520, 523, 426/94, 272, 302, 305, 505, 808, 289, 293, 296; 99/324, 467, 473, 483, 516; 126/20, 20.1, 20.2; 432/144, 145

[56] References Cited

U.S. PATENT DOCUMENTS

| | | | |
|---|---|---|---|
| 1,408,360 | 2/1922 | Kuhtz | 126/20 |
| 2,885,294 | 5/1959 | Larson et al. | 426/510 X |
| 3,578,463 | 5/1971 | Smith et al. | 426/241 |
| 3,650,766 | 3/1972 | Smadar | 426/94 X |
| 3,663,719 | 5/1972 | Gnaedinger | 426/510 |
| 3,676,158 | 7/1972 | Fischer et al. | 426/94 X |
| 3,705,813 | 12/1972 | Vogel et al. | 426/511 X |
| 3,718,082 | 2/1973 | Lipoma | 99/470 |
| 3,854,024 | 12/1974 | Kaufman et al. | 219/492 X |
| 4,011,805 | 3/1977 | Vegh et al. | 426/510 X |
| 4,047,476 | 9/1977 | Liebermann | 99/345 |
| 4,072,762 | 2/1978 | Rhodes | 426/510 |
| 4,167,585 | 9/1979 | Caridis et al. | 426/510 X |

FOREIGN PATENT DOCUMENTS

| | | |
|---|---|---|
| 754510 | 8/1956 | United Kingdom . |
| 820715 | 9/1959 | United Kingdom . |

OTHER PUBLICATIONS

*Food Processing,* Jul. 19, 1977, p. 112.

*Primary Examiner*—Arther L. Corbin
*Attorney, Agent, or Firm*—Gottfried, Philip H.

[57] ABSTRACT

Process and apparatus are provided for rapidly stabilizing a food product. The stabilization may take the form of either fixing or glueing a coating to the food product, treating the surface thereof to impart a particularly desired property such as rigidity or shape retention to the end product after further treatment thereof, cooking the entire product or a combination thereof. The product to be treated is moved through one or more processing chambers wherein it is contacted only by superheated steam, air having been excluded from the chambers. Saturated steam is supplied in a non-superheated condition at atmospheric pressure and remains substantially at atmospheric pressure throughout its movement through the apparatus. The steam is superheated within the chambers by the use of heating elements located within the chambers. By supplying the chambers with more steam than is sorbed by the food product during its treatment, air is effectively excluded from the chambers. In a preferred embodiment, two main product treatment chambers are arranged in tandem with the steam within the chambers capable of being automatically maintained at different pre-selected temperatures to process the food products differently in each chamber.

6 Claims, 5 Drawing Figures

METHOD OF FIXING AN EDIBLE COATING TO A FOOD PRODUCT

This is a continuation of application Ser. No. 839,616 filed Oct. 5, 1977, now abandoned.

The present invention relates generally to an apparatus and method for processing of food products and in particular, to an apparatus and method for processing food products in a very short time by use of superheated steam to the exclusion of air.

Numerous foodstuffs (such as chicken parts) are prepared for ultimate consumption by "breading" the raw foodstuff either with bread crumbs or other coatings or by first applying a "batter" to the foodstuff and then applying the coating to the batter in an effort at improving adherence of the coating. When the foodstuff is ultimately cooked, the batter and coating are altered by the heat and impart a desirable crispness to the exterior of the product. In some applications, such as with chicken, at times no breading or other coating is used and the product is prepared by applying only batter and cooked prior to ultimate consumption by a process such as frying which results in the batter becoming crisp thereby imparting the desired taste and consistency to the food product.

Formerly, the breading process, the battering process or the combination battering and breading processes were performed immediately prior to cooking of the coated food product. Fall off of the breading, the batter or the combination batter and breading from the food product during further cooking was a common occurrence, particularly when the further cooking was accomplished by frying the coated food product in oil. In the home environment such fall off of product was an annoyance but was tolerated.

In the commercial environment, a coating or combination of coatings such as described hereinbefore was placed on a product which was meant to be later cooked by the purchaser. Fall off of the coating during transport of the coated food product to the purchaser would, depending upon the amount of such fall off, render the coated food product less than totally desirable or even unsaleable.

A pre-coated food product is typically frozen by the commercial processor thereof. Freezing of the foodstuff after it is coated often increases the amount of coating fall off. In order to minimize such fall off, typically the foodstuff and coating combination are at least partially precooked (usually by frying) prior to freezing in an attempt at fixing or glueing the coating to the foodstuff. The glueing of the coating to the foodstuff which results from such frying has often been less than satisfactory although it is an improvement over freezing the coated foodstuff without such frying.

In addition to resulting in a less than totally satisfactory product (in that the coating even after prefrying is still subject to fall off during handling), prefrying generally results in some of the frying oil being absorbed into the coating and often into the final product. Since the final prefried product may undergo several at least partial freeze-thaw-freeze cycles before reaching the ultimate consumer, the oil used for the prefrying must be of very high quality in order to be sufficiently stable to survive such freeze-thaw-freeze cycles without imparting an undesirable flavor to the food product. Naturally, such highly stable oil is extremely expensive.

In addition, even if oil of high stability is used which can withstand several freeze-thaw-freeze cycles, the presence of oil in a frozen product over an extended period of time presents problems wherein an undesirable taste from the oil can be imparted to the food product.

Finally, some products which would normally benefit in terms of ultimate consumer acceptance from being breaded do not admit to glueing of a coating thereon by frying either because the underlying product itself cannot withstand the high temperature or the nature of the coating is such that frying would destroy it. An example of such latter coatings are those containing high amounts of sugar or coatings which are susceptible of dehydration by frying in oil or fat.

Recently, in addition to whole food products being available, there have appeared formed food products which are manufactured from particles of food products which are reformulated into shapes which approximate those of at least segments of the original products. Examples of such products are those formed by extruding a slurry of food material which includes a gel-forming matrix together with a formation of a gel-like skin around the extruded product as shown and described in U.S. Pat. Nos. 3,650,765 and 3,650,766, both of which issued Mar. 21, 1972 and both of which are assigned to the assignee of the present invention. Further, shaped comestibles may be formed by the use of a foodstuff slurry which is molded into a shape such as disclosed in U.S. Pat. No. 3,940,217 which issued Feb. 24, 1976 and which is assigned to the assignee of the present invention.

The formed food product noted in the patents disclosed above, and other formed food products are, after their formation, often covered with a batter and then breaded to improve the final palatability of the food product to the ultimate consumer. Typically, after coating, such formed food products are frozen and supplied to the ultimate consumer for consumption only after further cooking.

In order to prevent undesired fall off of the coating from such formed products, the products are often partially cooked at least on the outside thereof such as by being fried in oil in an attempt at glueing the coating to the formed food product. The problems mentioned above with such a process for glueing the coating with respect to whole food products also obtain with respect to formed food products. In addition, with all food products it is desirable to cook such food products only once rather than first partially cooking them followed by a completion of the cooking process at a later time.

Prefrying the coating on a food product to improve its adherence to the food product, either whole or formed, is only one reason for pre-treating the exterior of a food product. With certain products, it may be desired to apply moist heat to the exterior of a foodstuff and blanch it to easily remove the skin or alter enzyme activity such as with almonds or tomatoes or other foodstuffs. Since subsequent to such a blanching operation the foodstuff is often subjected to further processing operations, it is generally undesirable to have the foodstuff exposed to the moist heat for longer than absolutely necessary and is also undesirable to have the underlying food product discolor through oxidation.

It has long been known that, when it is desired to impart particular characteristics to the surface of a foodstuff, cooking thereof should be done in an environment where moisture loss from the surface of the product is controlled. For example, when exterior crispness is desired in baked bread products of various kinds, steam is often introduced into a gas or electrically-fired oven to control the rate of surface moisture loss thereby resulting in the desired texture of the finished baked product. In addition, it is known to partially or completely cook other foods in the presence of steam to impart desired characteristics such as crispness to the surface of foodstuffs. However, in all known uses of steam in an oven in the prior art, the steam is mixed with air in significant quantities.

It is an object of the present invention to provide a method and apparatus for rapidly processing a food product to fix a coating thereto, stabilize its shape, cook the food product, or a combination thereof.

It is a further object of the present invention to control the amount of moisture sorption of a foodstuff during fixing of a coating thereto, during stabilization or cooking thereof, or during a combination thereof.

It is a still further object of the present invention to provide a method and apparatus for rapidly fixing a coating to a foodstuff, for rapidly stabilizing the shape or cooking the foodstuff or a combination thereof, for controlling the rate of moisture sorption by a coating and/or by a foodstuff or both and for accomplishing such objects without the food product itself or coating absorbing fat from a cooking agent.

It is a still further object of the present invention to rapidly fix a coating to a foodstuff which cannot be fixed thereto by conventional means such as the use of fats or oils or by the use of a mixture of steam and air.

It is a still further object of the present invention to accomplish each and every one of the foregoing objects economically and while minimizing waste of energy.

In accordance with a specific embodiment of the present invention, an apparatus is provided for use in treating a foodstuff with superheated steam to the exclusion of air. At least one chamber for treatment of the food product is constructed and arranged to be in communication with a source of atmospheric saturated steam. Means are provided for completely filling the chamber with saturated steam so as to exclude substantially all air from the chamber. Heating members are provided within the chamber to superheat the steam within the chamber. Means are provided for permitting the introduction of a food product into the chamber for a predetermined period of time during which the food product is acted upon by the superheated steam. The apparatus includes structure to accept the supply of sufficient steam to be superheated to properly treat the foodstuff and exclude air while minimizing the supply of excess steam and to be energy efficient and not requiring the recirculation of steam.

The above brief description as well as further objects, features and advantages of the present invention will be more fully understood by reference to the following detailed description of the presently preferred but nonetheless illustrative embodiment in accordance with the present invention, when taken in conjunction with the accompanying drawing, wherein.

Figure 1:
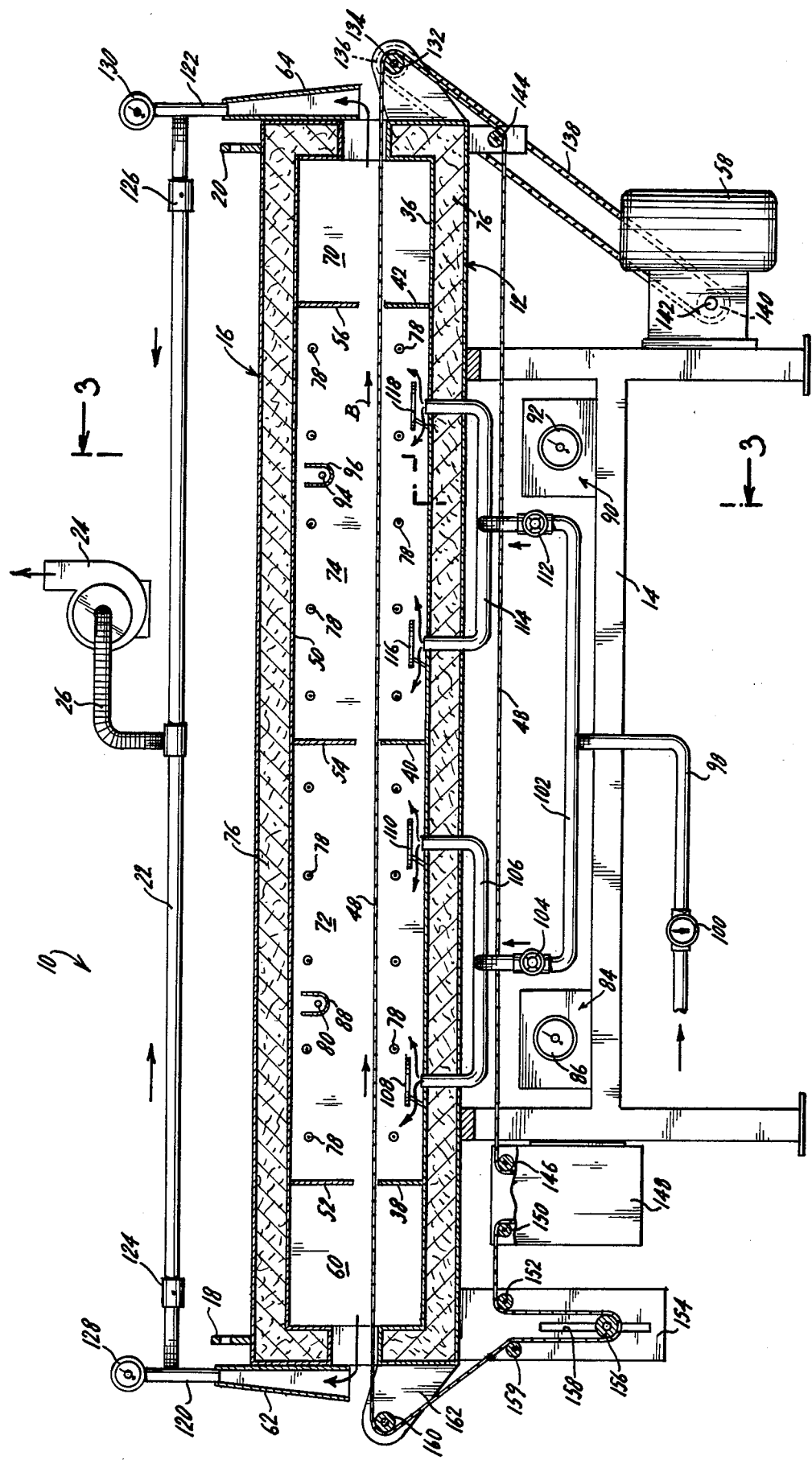
FIG. 1 is a front elevational sectional view, with parts broken away and shown in section, of an illustrative form of the present invention.

Referring now specifically to the drawing, and first to FIG. 1, in accordance with an illustrative embodiment demonstrating objects and features of the present invention, there is provided a processing oven, generally designated by the reference numeral 10, and which includes a lower oven member 12 supported by a base 14. The lower oven member 12 in turn, supports an upper oven member 16 thereon (see FIG. 3).

Figure 3:
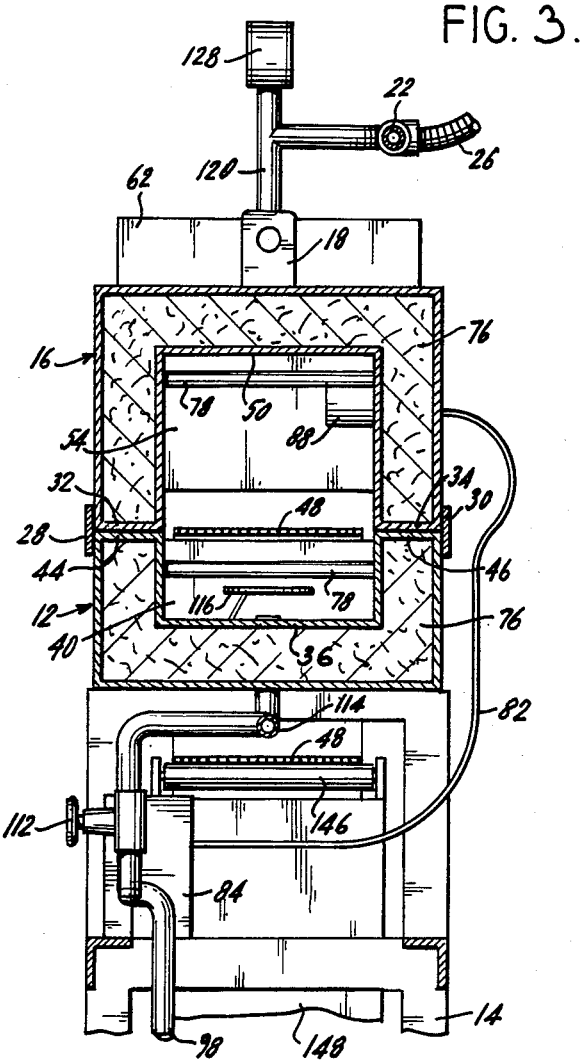
FIG. 3 is an enlarged fragmentary right side sectional elevational view thereof taken substantially along the line 3—3 of FIG. 1 and looking in the direction of the arrows.
Figure 4:
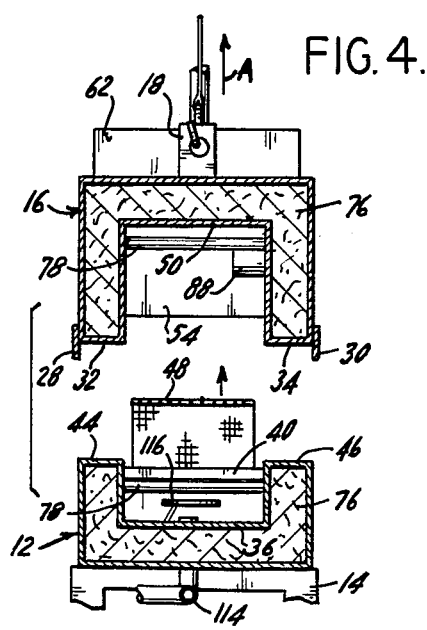
FIG. 4 is a fragmentary right side sectional view, similar to FIG. 3, showing the oven disassembled for cleaning; and, FIG. 5 is a schematic representation of the present invention including a schematic representation of an auxiliary control apparatus for use with the subject invention.

As may be best seen by comparing FIGS. 3 and 4, the upper oven member 16 is removably supported on the lower oven member 12 and may be lifted, for cleaning the interior thereof, by a crane or appropriately placed block and tackle means attached to hooks (one of which is shown in FIG. 4) inserted through openings in lifting ears 18, 20 fixed to the top of the upper oven member 16 by any conventional means such as by being welded thereto.

In view of a contemplated use of the processing oven 10 being for processing food products, in order to comply with the sanitary and health laws which exist and to which the oven may be subject, it is advantageous to be able to gain access to the interior of the oven. In order to permit movement of the upper oven member 16 in the direction indicated by the directional arrow A in FIG. 4 to permit cleaning of the interior of the oven, without unnessary disassembly of the oven mechanism, steam conduit 22 is attached to the inlet of an exhaust fan 24 by a flexible conduit 26. The function of steam conduit 22 and exhaust fan 24 will be described in detail hereinafter.

Similarly, in order to comply with applicable sanitary and health laws, the entire construction of the oven 10 as well as all mechanisms thereof which are in any manner likely to contact food to be processed must be formulated in accordance with such sanitary and health laws and regulations and must be susceptible of easy cleaning. Any material which satisfies these requirements and which can withstand the operating temperatures of the subject oven is satisfactory for construction of the oven such as stainless steel or the like.

In order to prevent undesired movement of the upper and lower oven members 16, 12 laterally with respect to one another, longitudinally extending plates 28, 30 are fixed to the front and rear of the upper oven member 16 by any convenient means such as being welded to the exterior wall thereof and extend for the entire oven length and an equal amount above and below the lower horizontal, longitudinally extending rear walls 32, 34 thereof (see FIGS. 3 and 4).

The interior of the oven 10 in its assembled condition is shown in the preferred embodiment as having a rectangular cross-sectional configuration as may be seen by reference to FIG. 3. Naturally, any other interior configuration which would accomplish the objects of the subject invention is considered to be within the contemplation and scope of the subject invention.

In the preferred embodiment of the subject apparatus, the rectangular solid interior configuration of the oven 10 is divided into four zones or areas, partly by the projection upward from the bottom wall 36 of three fixed plates, designated from left to right in FIG. 1 by the references numerals 38, 40, 42, respectively. The plates 38, 40, 42 extend transversely across the entire front-to-back width of the interior of the oven 10 (as may be seen by reference to FIG. 3) and are fastened to the interior walls of the lower oven member 12 by any conventional means such as by welding or the like. The plates 38, 40, 42 extend upwardly an amount to bring the top surface thereof just below the level of upper, horizontal, longitudinally extending top walls 44, 46 of the lower oven member 12 (see FIG. 4).

As may be noted by reference to FIGS. 1 and 3, the upper extent of the plates 38, 40, 42 is just below the lower surface of a conveyor belt 48 which is fashioned of a wire mesh material constructed and arranged to flex during its movement within and without the oven 10 and the lower surface of which is mounted to be located just above the upper, horizontal, kngitudinally extending walls 44, 46, all for a purpose and in a manner to be described hereinfater.

Located above plates 38, 40, 42 and aligned therewith, removably attached to the upper wall 50 of the interior of the oven 10 are plates which aid in dividing the interior of the oven into four compartments which plates are best seen and designated in FIG. 1 by the reference numerals 52, 54, 56, respectively. The plates 52, 54, 56 also extend transversely across the entire front-to-back width of the interior of the oven 10. For a purpose to be described hereinafter, the plates 52, 54, 56 extend downwardly from the upper wall 50 an amount such that the lowermost extent thereof is spaced a predetermined distance above the conveyor belt 48.

The plates 52, 54, 56 are removably fixed to the interior of the upper oven member 16 so that plates of different downward extent can be selectively inserted, depending upon the height of the product to be processed in the oven 10. Alternately, the plates 52, 54, 56 can be permanently affixed to the interior of the upper oven member 16 by any well-known method and may be made adjustable, such as by providing appropriately placed slots and fastening means, permitting adjustment in their downward extent and the amount which the lower part thereof is above the top of the conveyor belt 48. The manner of attachment of the plates 52, 54, 56 to the interior of the upper oven member 16 in the event that non-adjustable, removable plates are used, can be by any one of numerous well-known methods.

As may be noted by reference to directional arrows B (FIG. 1), the conveyor belt 48 is moved from left to right as seen in FIG. 1 by a motor 58 through mechanism and over a path to be described in detail hereinafter. For a purpose to be described hereinafter, the motor 58 may be any conventional motor powered by any available power source (not shown) and preferably includes a mechanism for controlling the speed thereof, also of conventional design and also not shown.

In view of the direction of movement of the conveyor belt 48 (from left to right in FIG. 1), product which is to be processed by the oven 10 and which is to be placed on the moving conveyor belt 48 progresses through the oven 10 from left to right. The first or leftmost chamber within the oven 10 is generally designated by the reference numeral 60 and is generally bounded on the right by the plates 38, 52. The chamber 60 is in fact an entrance or ingress transition chamber and is bounded on the left at the upper part thereof by the rightmost wall of the left steam collection hood 62.

Figure 2:
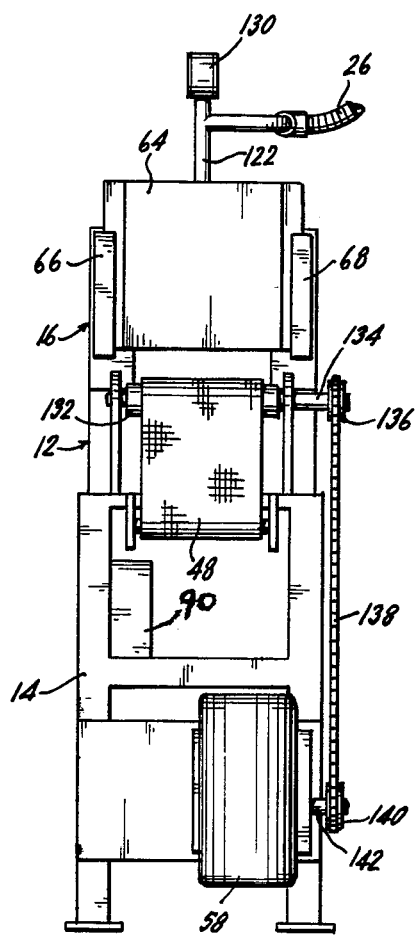
FIG. 2 is a fragmentary right side elevational view thereof.

The hood 62 is fixed to the left end of the upper oven member 16 by strap members in a manner similar to the manner in which the right steam collecting hood 64 is fixed to the right end of the upper oven member 16 by strap members 66, 68 (see FIG. 2).

The left and right steam collecting hoods 62, 64 are both fastened to the upper oven member 16 by strap members so that they are adjustable in a vertical direction depending upon the height of the product to be processed by the oven in a manner to be described in detail hereinafter. For reason to be described hereinafter, vertical adjustment of the left and right steam collecting hoods 62, 64 is facilitated by the existence of the flexible conduit 26 and its connection to the relatively fixed exhaust fan 24. The lower part of the entrance transition chamber 60 is bounded at its lower leftmost end by the leftmost part of the lower oven member 12.

In a similar manner, an exit or egress transition chamber designated by the reference numeral 70 is located at the right end of the oven 10 and is bounded on its left side by the plate 42, 56 at its upper right side by the left wall of the right steam collection hood 64 and is bounded at the bottom by the rightmost part of the lower oven member 12.

The oven 10 includes a first or left main chamber and a second or right main chamber in tandem therewith, each of which are generally designated by the reference numerals 72, 74, respectively. As may be seen most clearly by reference to FIG. 1, the first main chamber 72 is bounded on the left by plates 38, 52 and on the right by plates 40, 54. The second main chamber 74 on its leftmost extent is bounded by plates 40, 54 and on its rightmost extent is bounded by plates 42, 56. In all cases, the chambers 60, 72, 74, 70 extend horizontally and comprise the interior of the processing oven 10.

A space exists in between the interior and exterior walls of the oven 10. As may be seen by reference to FIGS. 1, 3 and 4, this space is filled with insulating material 76 of conventional type which must be able to withstand the operating temperatures of the oven without deteriorating. The operating temperatures of the oven 10 can be as high as 1200° Fahrenheit or higher, depending upon the foods to be processed in the oven. Naturally, the better the thermal efficiency of the insulating material 76, the less will be the heat loss through the walls of the oven and the more energy-efficient will be the oven.

Extending transversely across the oven walls completely from front-to-back within each of the first and second main chambers 72, 74, (both within the lower and upper oven members 12, 16) are a plurality of heating elements 78. As may be seen by reference to FIGS. 1, 3 and 4, the heating elements 78 within the upper oven member 16 are spaced below the interior top wall 50; and, the heating elements 78 within the lower oven member 12 are spaced above the interior wall 36.

The heating elements 78 in the preferred embodiment are electrically powered, are connected to a source of electricity (not shown) and are controlled in a conventional manner as described hereinafter. Alternately, the heating elements 78 can be heated with a gas burner being placed, for example, outside of the oven proximate to an opening on one end of each of the heating elements 78; which can be staggered rather than aligned as shown.

Located within the first main chamber 72 is a temperature sensing probe 80 spaced downward from the interior wall 50 and which may be of conventional design such as the "J" type thermocouple Model No. SFM-2022-G produced by Fenwall Incorporated and commercially available. The temperature probe or sensor 80 is connected by cable 82 (see FIG. 3) to a full scale indicating thermocouple temperature controller such as produced by Fenwall under Model No. 55-003140-108 and shown by reference numeral 84 in FIGS. 1 and 3. The temperature controller 84 also includes a temperature indicator 86. The temperature controller operates in a well-known manner to maintain a pre-selected temperature within the first main chamber 72 within specified tolerance limits, as sensed by the temperature sensor 80, by controlling the electricity supplied to the heating elements 78. The temperature sensor 80 is screened from the direct effects of any infrared radiation from the heating elements 78 by being surrounded by a screen 88 (see FIGS. 1 and 3).

In a similar manner to the heating elements 78 in the first main chamber, the heating elements 78 located within the second main chamber 74 are controlled and the temperature therein pre-selected by the setting of temperature controller 90 (see FIGS. 1 and 3). The temperature controller 90 includes a temperature indicator 92 and is connected by an appropriate cable to a temperature probe or sensor 94 (see FIG. 1) which is likewise shielded from direct infrared radiation from the heating elements 78 by a shield 96 placed thereabout.

The oven 10 is designed, as will be described in detail hereinafter, to operate using anaerobic, saturated steam which can be generated by any conventional generator capable of supplying anaerobic, saturated steam in the amounts required by the oven when operating in the manner to be described. The steam is initially supplied to the oven 10 through main steam inlet conduit 98 and first passes through steam flow indicator 100 (see FIGS. 1 and 5).

The saturated steam then enters manifold conduit 102 where it is diverted toward the first and second main chambers 72, 74 in a manner to be described. The steam entering the manifold conduit 102 which moves to the left as seen in FIG. 1 must pass through manually operated steam control valve 104 which is of standard construction and permits regulation of the amount of steam which passes from the conduit 102 into manifold conduit 106

As may be seen by reference to FIG. 1, manifold conduit 106 protrudes through both the inner and outer bottom walls of the lower oven member 12 and opens into the interior of the lower oven member and specifically into the interior of the first main chamber 72.

Spaced above each of the outlets of the manifold conduit 106 where it terminates within the first main chamber 72 are left and right baffle plates 108, 110 which are fixed to the lower wall 36 by appropriate support means (see FIG. 1). The baffle plates 108, 110 are shown in the preferred embodiment as being generally plane and rectangular although they may be any one of numerous other shapes including, without limitation, V-shaped. The function of the baffle plates 108, 110 is to diffuse the incoming steam to aid in even distribution of the steam throughout the first main chamber 72. Even steam distribution, among other functions to be described hereinafter, keeps direct infrared radiation from the heating elements 78 from reaching the product directly.

In a similar manner to that just described, the steam which enters the manifold conduit 102 and goes to the right, passes through manually operated control valve 112 which is similar to control valve 104 and which may be manually adjusted to vary the amount of steam passing through the manifold conduit 102 and into the manifold conduit 114. In a manner similar to the construction and arrangement of manifold conduit 106, manifold conduit 114 opens into the interior of the second main chamber 74 and likewise has left and right baffle plates 116, 118, appropriately fastened to the lower wall 36 and spaced above the point of termination of the manifold conduit 114 within the second main chamber 74 for a purpose similar to baffle plates 108, 110 (see FIGS. 1 and 3).

The steam exit conduit 22 is connected to the interior of the left and right steam collection hoods 62, 64 (for a purpose to be described hereinafter) through communication with left and right conduits 120, 122 which communicate directly with the interior of the left and right steam collecting hoods. The connection between the left and right conduits 120, 122 and the steam exit conduit 22 is controlled, proximate each of the conduits, by left and right butterfly damper valves 124, 126 for a purpose to be described hereinafter. The butterfly damper valves 124, 126 are adjustable to vary the amount of suction which the exhaust fan 24, through its communication with the steam exhaust conduit 22 and the steam collection hoods 62, 64 can exert on gases proximate the lower openings of such hoods to prevent unwanted steam migration.

Located within each of the left and right conduits 120, 122 is a temperature sensing apparatus (not shown), each of which is connected, in turn, to left and right hood temperature indicators 128, 130 for a purpose to be described hereinafter.

The conveyor belt 48 which, as noted hereinbefore, is of a wire mesh and a material which can withstand the heat and other variables to which it will be subjected in the subject apparatus, if moved in a generally clockwise direction as viewed in FIG. 1 in the direction of directional arrows B, being powered by roller 132. Roller 132 is, in turn, powered by being keyed to axle 134 on which is fitted sprocket wheel 36 (see FIGS. 1 and 2). The sprocket wheel 136 is in engagement with drive chain 138 which is powered by the motor 58 through sprocket wheel 140 which is powered by the rotation of output shaft 142 of the motor 58 in a well-known manner.

The conveyor belt 48 is of a width which is slightly less than the width of the interior of the oven 10 and passes over numerous idler rollers or support rails during its circuit through the interior of the oven and then exteriorly thereof. After exiting from the interior of the oven, the conveyor belt 48 passes over idler roller 144 mounted below the bottom of the lower oven member 12 and thence (perhaps after passing over additional idler rollers not shown) over idler roller 146 and into belt treatment apparatus 148.

In belt treatment apparatus 148, by well-known methods, the belt is cleaned, for example by rotating brushes. Within the apparatus 148 the belt may also be treated such as by being oiled prior to its exit therefrom for example to prevent sticking of the food to it. The belt 48 exits from the apparatus 148 over idler roller 150 and contacts idler roller 152 located on support member 154 which depends from the bottom of the lower oven member 12.

A dancer roller 156 rides within a slot 158 within the support member 154, and within a similar slot in a similar support member (not shown) on the other side of the lower oven member. By virtue of its weight, the dancer roller 156 maintains the proper tension on the conveyor belt 48 as it passes over the idler rollers including idler roller 159 on support member 154 and idler roller 160 on support member 162.

The construction and arrangement of the dancer roller 156 and its manner of mounting permits tension to be maintained on the conveyor belt 48 during normal operation of the oven 10. It also permits the belt 48 to be raised for cleaning from under it of any food particles which may pass through the mesh of the conveyor belt and land on the wall 36 when the upper oven member 16 is raised for cleaning (see FIG. 4).

Figure 5:
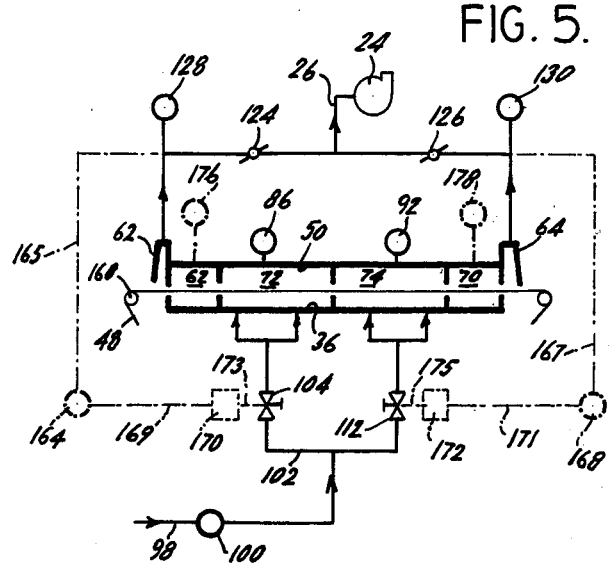

In FIG. 5 there is illustrated a schematic representation of some of the elements of the subject invention, including a showing in phantom, of an auxiliary system which can be used with the apparatus and method of the subject invention to make it even more energy efficient.

In the auxiliary system, the collecting hood temperature indicators 128, 130 are either replaced or are supplemented by a pair of proportioning potentiometric indicating temperature controls 164, 168 each of which includes a sensor located within the left and right conduits 120, 122 to sense the temperature of the fluid drawn into the collecting hoods 62, 64. Such a proportioning potentiometric indicating temperature control is commercially available and is manufactured by Fenwall Incorporated under the designation 400 Series.

When properly adjusted, the controls 164, 168, in addition to being connected through conduits 165, 167 to sensors in communication with the interior of collecting hoods 62, 64 are connected through conduits 169, 171 in communication with proportional motor actuators 170, 172 which are commercially available such as those manufactured by Penn Controls Division of Johnson Service Company under its series M80F, M80H or M80J or the like. By appropriate linkage 173, 175, the proportional motor actuators 170, 172 are connected to replacements for hand-operated valves 104, 112 which may be any commercially available two-way, single-seat globe valves such as those manufactured by Penn Controls Division of Johnson Service Company under type V90AA used to control the amount of saturated steam entering each of the manifold conduits 106, 114 in a manner and for a purpose to be described hereinafter. In the use of the auxiliary system, the proportioning potentiometric indicating temperature controllers 164, 168 may have their own temperature indicating scale (as in the 400 Series manufactured by Fenwall Incorporated) or the temperature indicators 128, 130 may be used.

In addition, if desired, in either the manually controlled or in the automatically controlled system just described utilizing the temperature controls 164, 168 and motor controls 170, 172, auxiliary temperature indicators 176, 178 as shown in FIG. 5 can be included to permit monitoring of the temperature within ingress and egress transition chambers 60, 70 respectively.

During operation of the oven 10 the values for the possible operating parameters are largely controlled by the effects desired to be produced on the product to be passed through the oven. In general, it is advantageous to add moisture to a product to be processed by the oven particularly when the product is to be further processed such as by freezing after its exit from the oven. This is true whether the product is to be fully cooked by having a relatively slow progress through the oven 10, whether the product is merely to have a coating glued thereto without cooking the product during its relatively rapid journey through the oven (approximately on the order of 30 to 40 seconds for a product such as the formed onion rings disclosed in the '765 and '766 patents noted above) or whether the product is to be stabilized in some other manner.

The reasons why it is desirable to increase the moisture content of the product are many. For example, during the final processing of the product prior to it being consumed, moisture will likely be lost from the product. In addition, moisture will likely be lost from the frozen product during the various freeze-thaw-freeze cycles which the product will undergo or as a result of sublimation.

Using the various parameters discussed and others, it will be decided how much moisture it is desired to add to the product per pound. Using the pounds of product per hour to travel through the machine, it will be determined how much steam is required for processing the product. Naturally, included in this computation will be the size and number of items to be passed per hour through the oven as well as the specific physical dimensions of the oven and the degree of absorption of moisture which the product will permit.

If it is determined, for example, that eight pounds per hour of steam will be absorbed by the product in traveling through the oven in 30 to 40 seconds, a certain amount of steam must be permitted to exit from the ingress and egress transition chambers 60, 70 in order to insure that the entire interior of the oven 10 is blanketed with steam and that all air is excluded. This can be accomplished, for example, if one pound per hour of excess steam is permitted to escape from each of the longitudinally opposite ingress and egress orifices of the oven 10.

Atmospheric saturated steam is supplied to the oven through the conduit 98, the exhaust fan 24, is turned on and the butterfly damper valves 124, 126 are adjusted, along with hand-operated valves 104, 112 to provide an equal flow of steam out of each of the ends of the oven. The temperature controllers 84, 90 are adjusted to cause the heating elements 78 to raise the steam temperature in the oven to predetermined levels, for example, 525° Fahrenheit in the first main chamber 72 and 625° Fahrenheit in the second main chamber 74. If, as noted hereinbefore, the desired excess amount of steam to escape from each end of the oven 10 is to be one pound per hour, the valves 104, 112 and dampers 124, 126 are adjusted until the flow indicator 100 shows that two pounds per hour of steam are being supplied. The temperature within the collecting hoods is then noted as indicated by the collecting hood temperature indicators 128, 130.

The conveyor belt 48 is then started and the motor 58 is adjusted to run at a speed to permit the materials to pass through the oven at a speed which will permit sorption of the predetermined amount of moisture from the steam at the pre-selected temperatures. In addition, the collecting hoods 62, 64 have been moved an appropriate distance away from the top of the conveyor belt 48 so as not to have the lower parts thereto interfere with the passage into the oven of the product on the conveyor belt but yet sufficiently close to the top of the product so as to prevent any undesired excess steam from escaping.

The plates 52, 54, 56 have likewise been selected to be of appropriate height above the top of the product on the conveyor belt 48 so as not to interfere with the passage of food products through the oven but to prevent unwanted migration of the steam. Alternately, if adjustable plates 52, 54, 56 are used, they are adjusted so as to prevent any interference with the product on the conveyor belt passing through the oven.

During the startup procedure, an excess of steam is supplied to the oven 10 through the conduit 98. For example, were it decided that a total of two pounds per hour of steam should escape out of the left and right ends of the oven 10 to insure that there would be no air within the oven, and where it had been determined previously that eight pounds of steam per hour was the amount of steam to be absorbed by the product (for a total of ten pounds per hour), an excess of two pounds per hour or a total of ten pounds per hour of steam would be supplied through the conduit 98.

Once the oven was operating and had reached operating conditions, the valves 104, 112 would be adjusted until the readings of the collecting hood temperature indicators 128, 130 correlated with the pre-set temperature of the oven prior to insertion of product therein. As long as the value of the collecting hood temperature indicators 128, 130 remained at the pre-product-insertion values, a user of the subject apparatus could be certain that a blanket of pure steam existed within the first and second main chambers 72, 74 and that all air had been excluded.

It should be noted that the condensation of steam on the product is exothermic, releasing the latent heat of vaporization which adds to the heat in the oven 10. The temperature probes 80, 94 sense the actual temperature in the oven chambers and, through controllers 84, 90, maintain the set temperature within the oven 10 by appropriately controlling the power supplied to heat the heating elements 78, which heat the steam supplied to the pre-set temperatures.

The existence of the plates 108, 110, 116, 118 poised over the exit points of the conduits 106, 114 into the respective first and second main chambers 72, 74 coupled with the open mesh of the conveyor belt 48 and the controlled negative pressure exerted by the exhaust fan 24 by virtue of adjustment of dampers 124, 126 results in a constantly moving blanket of steam, without air, continuously contacting the product. The steam moves slowly enough through the oven 10 so that no breading is removed from the product thereby.

Naturally, the oven could be operated without the collecting hoods 62, 64 and without the exhaust fan 24 and associated mechanism by supplying sufficient steam to insure that no air could possibly enter the interior of the oven 10.

The use of the collecting hoods 62, 64, the exhaust fan 24 and associated and interconnected mechanism permits minimization of the use of excess steam (defined as that not necessary to maintain the absence of air within the oven and not sorbed by the product) thereby rendering the subject apparatus extremely efficient.

Efficiency of the subJect apparatus can be further increased by the use of the auxiliary system shown in phantom in FIG. 5. With the auxiliary system, as with the manual system, the amount of steam which will be sorbed by the product to be processed by the oven must be determined and will vary depending upon the nature of the product, the residence time within the oven, the amount of moisture which it is desired to "drive into" the product, all of which must be determined before any other calculations can be made. It is then determined how much outflow of steam through the left ingress and right egress from the oven 10 is necessary in order to insure that no air will enter into the interior of the oven. The interior temperature of the first and second main chambers 72, 74 must then be set. The temperatures of the first and second main chambers will depend upon the effect which it is desired to achieve with the oven 10 and will naturally depend upon the nature of the product as well.

Once the desired volume of outflow steam has been decided upon, once the first and second main chambers 72, 74 have reached operating temperature, once the exhaust fan 24 has been turned on and the butterfly damper valves 124, 126 have been adjusted, it is known what values are to be maintained for the temperatures within the steam collecting hoods 62, 64.

At that time the controls 164, 168 are set to maintain these desired values by receiving the temperature signals from the probes located within the hoods 62, 64 via conduits 165, 167. The controls 164, 165 in a well-known manner, utilize this information to send a signal through conduits 169, 171 to motor actuators 170, 172 which, through conduits 173, 175 control the motorized valve replacements for manual valves 104, 112.

This process just described automatically controls the amount of steam supplied to the oven 10 through the conduit 98 to maintain the desired temperatures within the hoods 62, 64 which is directly related to the condition of maintaining only steam within the interior of the oven 10 to the exclusion of air.

As will be appreciated, if excess steam were not supplied to the interior of the oven 10 and, rather than having such excess steam exit through the left and right ingress and egress orifices of the oven so as to migrate into the steam collecting hoods 62, 64, outside air would be permitted to migrate into the interior of the oven through either the ingress or egress ports or both. Were this to happen, the temperature within the hoods 62, 64 would drop relative to the temperature when sufficient excess steam were provided to the interior of the oven 10 to prevent such migration of air into the oven. The principal reason for this temperature difference is the fact that the steam which exits through the ingress and egress ports of the oven has been superheated within the oven and is hotter than the temperature of the ambient air surrounding the oven even when mixed therewith.

As described hereinbefore, when the exhaust fan 24 is operating, a certain amount of outside air is drawn into the hoods 62, 64. However, the butterfly damper valves 124, 126 are adjusted so that the "pull" exerted by the fan 24 on the interior of the hoods 62, 64 is not so great as to draw in a significant amount of outside air. Rather, the butterfly damper valves 124, 126 are adJusted so as to exert a pull on the steam exiting from the oven 10 to prevent unwanted migration thereof and incidentally aids in gently drawing out of the interior of the oven the superheated steam therein in order, in part, to insure that there is minimum movement of steam within the interior of the oven particularly since the excess steam migrates slowly outwardly thereof at a controlled rate.

As is well-known, according to well-known laws of physics, the steam which exits from the interior of the oven has a tendency to rise and go up the collecting hoods and does not require very much assistance from the fan 24.

The oven 10 has been shown and described with first and second main chambers 72, 74 and each of the chambers have been described as being provided with separate sensors 80, 94 and temperature controllers 84, 90. It will be appreciated that the interior heated portion of the oven may consist of either a single main or may consist of additional main heated chambers, beyond two. Each main chamber will have its own temperature controlling apparatus to control the amount of superheat provided to the steam within each of the chambers. In addition, the oven could be produced without the ingress and egress transition chambers 60, 70.

The apparatus and method of the subject invention may be used with various food products either to fix a coating thereto with or without cooking the product or, if the temperature and residence time within the oven is appropriate, to entirely cook a food product. Conceivably, with a sufficient number of main chambers in tandem, a coating could first be fixed to a product and, in a subsequent tandem chamber located downstream of the coating-fixing chamber, the product could be cooked before being supplied to a further process or such as a cooker, or to a blast freezer and then, after packaging, to a storage freezer.

Among the variety of products which could have coatings affixed thereto by the subject apparatus and method are: onion rings, both fresh and formed from pieces; shrimp, both whole and formed from pieces; clams, both whole strips and formed from pieces; fruit, both fresh and formed from pieces; and, potato products, both fresh and formed from pieces.

In view of the subject apparatus and method contacting the product in the oven only with substantially atmospheric superheated steam, (andnot with air and steam), heat is transferred much more rapidly to the item thereby greatly decreasing the residence time of the product within the oven and consequently reducing the length of the oven required, resulting in space savings. This reduced residence time is due at least in part to the greater specific heat of steam (approximately 0.45) as compared to the specific heat of air (approximately 0.25).

A further benefit accrues from the subject process using superheated steam in the absence of air in addition to moisture being driven into the product, for example, to replace moisture which has either previously been lost or which will likely be lost in future processing and/or storage of the product. The absence of air prevents unwanted browning of certain food products such as, for example, breads or rolls which are later meant to be "browned and served" by the ultimate consumer. Where such browning is required or desired, such as with certain breads, such browning could be accomplished by a subsequent application, either in the oven or out of it, of either air or oil while the surface of the food product remains hot.

For the most part, as noted hereinbefore, the absence of oil in the product after it has been processed by the subject apparatus and method is a great benefit. In addition, the fact that the subject apparatus and method so rapidly and efficiently glues coatings to food products and/or partially or completely cooks them while adding moisture without the use of oil makes it usable for products which would be deteriorated by the use of oil such as those with a high sugar content or which contain products such as coconut.

As noted hereinbefore, a broad range of products can be processed with the subject apparatus with the precise method of use thereof varying in the particular temperatures selected for the first and second main chambers 72, 74 or for the additional main chambers not shown. In addition, the amount of steam supplied to each of the first and second main chambers per hour can be varied. The amount of steam supplied to each of the chambers 72, 74 and the temperatures to which the steam supplied therein shall be superheated depends upon the product, its size, the steam absorption characteristics of the product including how the starch in the product changes under the action of exposure to steam and the effect which it is desired to achieve. For example, different temperatures and steam supply rates would be used to glue a coating than would be used to completely cook a product.

It should be noted that the use of different baffle plates 52, 54, 56 or the use of variable sized baffle plates which are adjusted relative to the height of the product to be placed on the conveyor belt 48 not only prevents unwanted escape of superheated steam from the chambers 72, 74 but also aids in maintaining superheated steam of adjacent chambers within those chambers when migration thereof would be undesirable.

As an example of a specific, illustrative manner of use of the subject apparatus, onion rings are formed using a starch-containing matrix according to the disclosure of U.S. Pat. No. 3,650,765, are battered with a batter containing undamaged starch and breaded with a coating that represents approximately 25% to 30% of the coated weight of the ring. The oven is arranged so that the temperature of the superheated steam in the first main chamber 72 is approximately 525° Fahrenheit and the steam is supplied thereto at a rate of approximately ten pounds per hour (to drive a large amount of moisture into the product) by appropriately varying the setting of the valve 104 (or its mechanically actuated counterpart) and of temperature controller 84. The temperature of the superheated steam in the second main chamber is set at approximately 625° Fahrenheit and steam is supplied to that chamber at a rate of approximately two pounds per hour (for example, to dry the product somewhat or further stabilize it) by appropriately varying the setting of the valve 112 (or its mechanically actuated counterpart) and of temperature controller 90.

The onion rings pass through the oven 10 in approximately 30 to 40 seconds with an oven which is approximately eight inches wide and has main chambers each of which are approximately three feet in length. The onion rings enter the oven at approximately 60 to 70 degrees Fahrenheit and, by the time they leave, have reached a temperature of 150 to 160 degrees Fahrenheit. The batter and breading on the onion rings which leave the oven have been fixed to the formed ring with sufficient strength so that the coating does not fall off during conveying thereof to a blast freezer, through the blast freezer, on to packaging equipment and into a storage freezer. In addition, the coating does not fall off during shipment. In addition, when the onion rings are finally cooked by frying, they have a lower fat content, are crisper and better tasting than onion rings which have the batter and breading fixed thereto by pre-frying.

While the difference in temperatures between the first and second main chambers 72, 74 and the differences in the amounts of steam supplied to each varies depending upon the products treated by the oven and the subject method, with the onion rings as described, it was discovered that it was advantageous to supply a greater amount of steam at a lower degree of superheat to the first main chamber 72 and thereby initially drive a large amount of moisture into the product and supply a smaller amount of steam at a higher degree of superheat in the second main chamber 74.

It was found that when a higher degree of superheat was used in the first main chamber 72 than in the second main chamber 74, the coating did not adhere as well although the ring produced was strong enough to be transferred to the blast freezer with significantly less damage than occurred during coating fixing by frying in oil. Similarly, when both the first main chamber and the second main chamber were at the same degree of superheat (approximately 600° Fahrenheit), less moisture was driven into the product. Although coating adherence was good, once the ring was cooked by frying, the sensory qualities of the onion ring (crispness and taste) were not as good as with the lower degree of superheat followed by the higher degree of superheat.

It has also been found that with other products such as formed shrimp shapes, when the temperature in the second main chamber 74 is higher than the temperature in the first main chamber 72 (450° Fahrenheit versus 400° Fahrenheit) the coating is best fixed to the formed product by supplying steam at the same rate to each of the main chambers (on the order of six pounds per hour to each chamber). Residence time of the product within the oven is still on the order of 30 to 40 seconds.

It was found that when it was desired to fix a coating to a formed product not designed for further cooking (particularly, a formed apple product coated with, for example, cookie crumbs) the coating was best fixed by passage through the oven 10 with both the first and second main chambers 72, 74 at 450° Fahrenheit. Steam was supplied to the first and second main chambers at rates of ten pounds per hour and two pounds per hour, respectively. A residence time within the oven 10 of approximately 30 seconds resulted in a firmly adhered coating which retained its sweet taste and was compatible with the interior of the apple.

It has been found that the amount of moisture which is "driven into" the product is controlled by the degree of superheat of the steam in contact with the product. In view of the subject apparatus including means within each chamber for controlling the degree of superheat of the steam (and the ability to separately control the amount of steam supplied to each main chamber and the nature and kind of treatment of the product in contiguous chambers) a single source of saturated steam is usable to accomplish the desired ends of the process thereby greatly simplifying the apparatus.

When the products initially enter the interior of the oven 10, they first pass into the entrance or ingress transition chamber 60. As may be noted by reference to FIG. 1, there are no heating elements 78 within the transition chamber 60. At the downstream or rightmost boundary of chamber 60, plates 38, 52 restrict the passage of superheated steam from the first main chamber 72 into the transition chamber 60 although a sufficient amount is moved through the transition chamber to incidentally heat it and to insure that no air enters the interior of the oven 10.

The temperature of the incoming food product is incidentally raised by its passage through the transition chamber 60 and a certain amount of moisture is driven into the product by contact with steam in that transition chamber.

The product then progresses downstream on belt 48 to the right underneath the plate 52 out of the transition chamber 60, and into the first main chamber 72. In the chamber 72 the product is contacted by superheated steam which, in general, is at the same or a lower temperature than the product will encounter in the second main chamber 74.

After progressing through the first main chamber 72, the product passes underneath the plate 54 and into the second main chamber 74. In chamber 74, in general, the product is contacted by steam which is at a higher degree of superheat than it encountered in the preceeding upstream chamber 72. Finally, the product passes under the plate 56 and into the egress transition chamber 70, having been completely surrounded by superheated steam in its passage through the oven.

As may be noted by reference to FIG. 1, the egress transition chamber 70 does not include therein any heating elements 78 therein although, by virtue of the passage therethrough of the superheated steam passing out of second main chamber 74 between plates 42 and 56, the chamber 70 is incidentally heated and does contain superheated steam to the exclusion of air.

As the product leaves the interior of the oven and while it is still on the conveyor belt 48 (or immediately thereafter when it may be transferred to another conveyor belt for transportation to another processor such as a blast freezer), any moisture which exists on the surface of the product immediately vaporizes.

It should be noted that whenever the word "cooking" is used herein it is understood to refer, unless the context clearly indicates otherwise, to a substantial or significant chemical change to the product to be treated by use of the subject apparatus in the described process. Consequently, the change which occurs to the undamaged starch which appears in the products and/or coatings of the products discussed hereinbefore, when moisture is driven into the products or coatings is not cooking, the change in the starch being viewed as primarily of a physical and not of a chemical nature. An example of cooking would be aerobic oxidation, a change which would not occur with the subject method in view of its being anaerobic.

From an understanding of the subject invention, it is clear that either through manual operation of control valves 104, 112 or through use of the auxiliary control system described hereinbefore, at least in part because of the short residence time of food products within the oven 10 (measured in seconds rather than minutes as with other systems), and at least in part because of the need to only supply a slight amount of excess steam above that sorbed by the product, the subject apparatus and method is extremely energy efficient.

The energy efficiency of the apparatus and method disclosed herein does not require the recirculation of steam which is collected by the hoods 62, 64. In view of the subject apparatus and method being constructed and arranged to supply steam to the exclusion of air within the oven, recirculation of the steam plus air mixture which inevitably will be collected by the collecting hoods 62, 64 would require that the air be removed from the steam and air mixture before anaerobic steam required by the subject process could be used in the subject apparatus.

In addition, if recirculation of steam were to occur, all of the disadvantages of the prior art systems wherein superheated steam was supplied would be present herein most notably the requirement for high velocity supply of such steam to minimize heat loss and the requirement for excessive insulation of the conduits for the same purpose. In the present apparatus and method such disadvantages are not present.

It is understood that when the exclusion or absence of air is referred to herein, what is meant is the exclusion or absence of substantially all of the air from the processing chamber within known limits. Among the factors which affect the lack of complete exclusion of air are the possibility that the saturated steam which is supplied may be produced from water which has an amount of air dissolved therein; the known phenomenon of the lack of complete efficiency of the replacement of one gas by another; and others.

As will be readily apparent to those skilled in the art, the invention may be used in other specific forms without departing from its spirit or essential characteristics. The present embodiments are, therefore, to be considered as illustrative and not restrictive, the scope of the invention being indicated by the claims rather than by the foregoing description, and all changes which come within the meaning and range of equivalents of the claims are therefore intended to be embraced therein.

What is claimed is:

1. A method of fixing an edible coating to a food product without frying which comprises applying a starch-containing coating composition to the exterior of a food product, exposing said coated food product to superheated steam at atmospheric pressure in the substantial absence of air for a time which is sufficient to stabilize said coating and adhere said coating to the food product but which is insufficient to substantially cook said coated food product.

2. The method according to claim 1 including providing at least a first food processing chamber, continously passing a plurality of said coated food products through said chamber, supplying an amount of steam to said chamber sufficient to blanket said food products with steam and to have a continuous outflow of steam from said chamber; and permitting said excess amount of steam to exit from said chamber thereby ensuring the fixing of said edible coating to said food products in the substantial absence of air.

3. The method according to claim 2, including supplying saturated steam to said chamber and superheating said steam only within said chamber.

4. The method according to claim 2, including providing first and second contiguous food processing chambers, coninuously passing said plurality of said coated food products through said first and second chambers, in turn; and supplying a greater amount of steam at a lower degree of superheat in said first chamber than in said second chamber.

5. The method according to claim 4, wherein said degree of superheat in said first chamber is approximately equal to 525° F. and in said second chamber is approximately equal to 625° F.

6. A method for continuously rapidly stabilizing a plurality of coated food products to fix an outer coating containing starch thereto, without frying, prior to further processing of said coated food products while the interior thereof remains substanially uncooked, said method comprising: placing said coated food products in a processing oven for a predetermined time, said oven having at least a first food processing chamber constructed to continuously pass said coated food products therethrough; maintaining said processing chamber at substantially atmospheric pressure; supplying saturated steam, at substantially atmospheric pressure, to said processing chamber in an amount in excess of the amount to substantially fill said processing chamber and blanket said food products; superheating said steam only within said processing chamber; permitting said excess amount of steam to exit from said processing chamber thereby maintaining the exclusion of substantially all of the air from said processing chamber and aiding in maintaining said chamber at substantially atmospheric pressure; said predetermined time being only sufficient to rapidly fix said starch-containing coating to said food products while maintaining said coated food products substantially uncooked.

* * * * *